United States Patent
Vega et al.

(10) Patent No.: US 9,344,755 B2
(45) Date of Patent: May 17, 2016

(54) FAST-RESUME AUDIO PLAYBACK

(71) Applicant: Sonos, Inc., Santa Barbara, CA (US)

(72) Inventors: Luis Vega, Cambridge, MA (US); Ted Lin, Santa Barbara, CA (US); Jim Dolan, Boston, MA (US)

(73) Assignee: SONOS, INC., Santa Barbara, CA (US)

( * ) Notice: Subject to any disclaimer, the term of this patent is extended or adjusted under 35 U.S.C. 154(b) by 211 days.

(21) Appl. No.: 14/042,301

(22) Filed: Sep. 30, 2013

(65) Prior Publication Data

US 2015/0094834 A1    Apr. 2, 2015

(51) Int. Cl.
| | |
|---|---|
| *G06F 17/00* | (2006.01) |
| *H04N 21/433* | (2011.01) |
| *G06F 3/16* | (2006.01) |
| *G11B 27/00* | (2006.01) |
| *G11B 27/11* | (2006.01) |
| *H04N 21/436* | (2011.01) |
| *H04N 21/81* | (2011.01) |
| *H04N 21/8547* | (2011.01) |

(52) U.S. Cl.
CPC ............ *H04N 21/4333* (2013.01); *G06F 3/165* (2013.01); *G11B 27/005* (2013.01); *G11B 27/11* (2013.01); *H04N 21/43615* (2013.01); *H04N 21/8106* (2013.01); *H04N 21/8547* (2013.01)

(58) Field of Classification Search
CPC ........... G11B 27/102; H04N 21/23106; H04N 21/4147; H04N 21/4333
See application file for complete search history.

(56) References Cited

U.S. PATENT DOCUMENTS

| | | | |
|---|---|---|---|
| 2005/0251835 A1* | 11/2005 | Scott et al. | 725/88 |
| 2009/0279867 A1* | 11/2009 | Hamada et al. | 386/96 |
| 2011/0255841 A1* | 10/2011 | Remennik et al. | 386/248 |
| 2012/0009906 A1* | 1/2012 | Patterson et al. | 455/414.1 |
| 2015/0003816 A1* | 1/2015 | Clapper | 386/343 |

OTHER PUBLICATIONS

The Industrial Infomration Technology Handbook; Chapter 28 RTP, RTCP, and RTSP—Internet Protocols for Real-Time Multimedia Communication; Arjan Durresi and Raj Jain; copyright 2005.*
Real Time Streaming Protocol (RTSP) Request for Comments 2326 (RFC 2326); Apr. 1998.*

* cited by examiner

*Primary Examiner* — Andrew C Flanders

(57) ABSTRACT

Embodiments are provided for fast-resume of audio playback. An example method includes transmitting a plurality of frames, each frame comprising audio information and playback timing information, the playback timing information identifying a time to play the audio information of the respective frame, wherein the playback timing information comprises a time relative to a clock; receiving a pause command, wherein the pause command indicates that the at least one playback device is to cease playback of the audio information; subsequent to receiving the pause command, receiving a resume command; based on the resume command, identifying a range of frames previously transmitted, wherein the range of frames have playback timing information subsequent to a time of receiving the pause command; and, based on the resume command, instructing at least one playback device to (i) update the playback timing information in the range of frames, and (ii) play the audio information.

20 Claims, 13 Drawing Sheets

FAST-RESUME AUDIO PLAYBACK

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud in synchrony. The Sonos system can be controlled by software applications downloaded to certain network capable, mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

Figure 1:
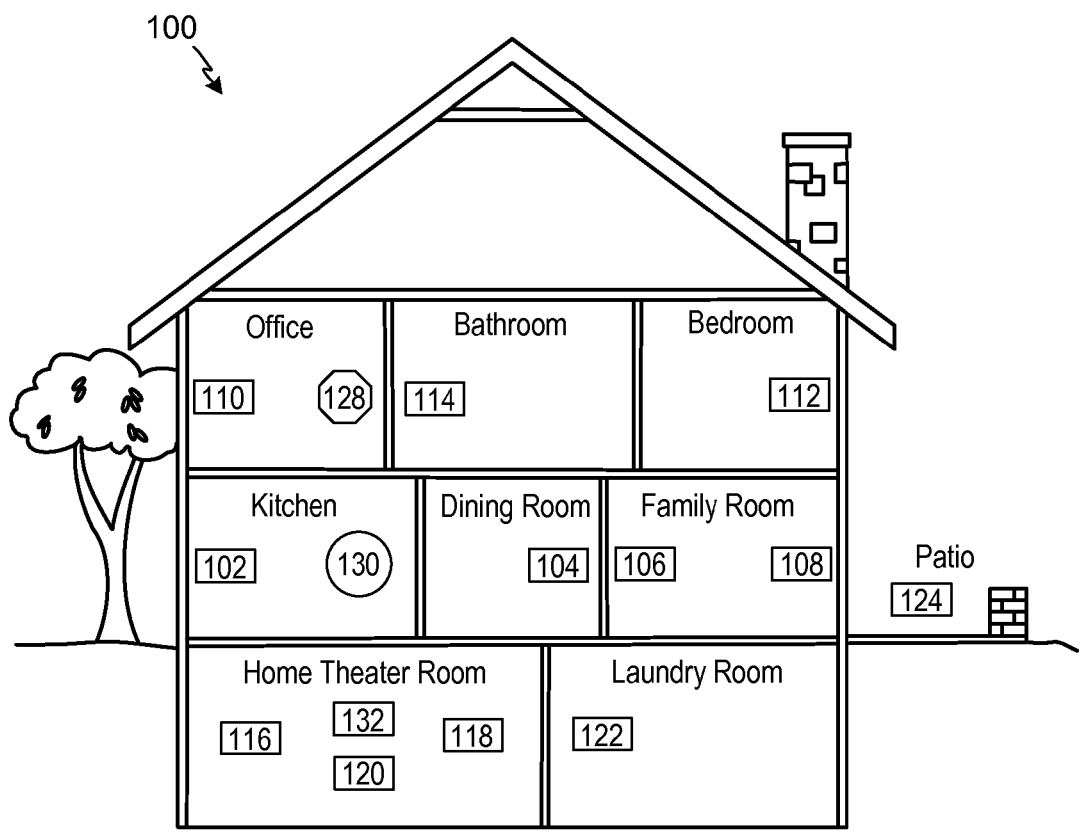
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments of the methods and apparatus disclosed herein enable a user to fast-resume playback.

An example embodiment of a method implemented in accordance with the present disclosure includes transmitting, by a device to at least one playback device, a plurality of frames, each frame of the plurality of frames comprising audio information and playback timing information, the playback timing information identifying a time to play the audio information of the respective frame, wherein the playback timing information comprises a time relative to a master clock; receiving, by the device, a pause command, wherein the pause command indicates that the at least one playback device is to cease playback of the audio information; subsequent to receiving the pause command, receiving, by the device, a resume command; based on the resume command, identifying, by the device, a range of frames previously transmitted by the device to the at least one playback device, wherein the range of frames have playback timing information subsequent to a time that the device received the pause command; and based on the resume command, instructing, by the device, the at least one playback device to (i) update the playback timing information in the range of frames, and (ii) play the audio information In some embodiments, the instructing, by the device, the at least one playback device to update the playback timing information in the range of frames further comprises: instructing, by the device, the at least one playback device to update the playback timing information in the range of frames when the range of frames is above a threshold number of frames.

In some embodiments, the audio information is received in a first audio stream by the device prior to transmission, by the device, to the at least one playback device.

In some embodiments, the first audio stream is associated with a first cryptographic key.

In some embodiments, the method further includes based on the pause command, terminating, by the device, reception of the first audio stream.

In some embodiments, the method further includes based on the resume command, initiating reception, by the device, of the audio information in a second audio stream; determining, by the device, whether the second audio stream is associated with the first cryptographic key or with a different cryptographic key; and when the second audio stream is associated with the different cryptographic key, providing, by the device, the different cryptographic key to the at least one playback device.

In some embodiments, the device comprises a playback device, and wherein the master clock comprises a clock associated with the device, and the method further comprises: based on the resume command, playing, by the device, the audio information synchronously with the at least one playback device.

An example embodiment of a non-transitory computer-readable storage medium implemented in accordance with the present disclosure includes a set of instructions for execution by a processor, the set of instructions, when executed cause a device to: transmit, to at least one playback device, a plurality of frames, each frame of the plurality of frames comprising audio information and playback timing information, the playback timing information identifying a time to play the audio information of the respective frame, wherein the playback timing information comprises a time relative to a master clock; receive a pause command, wherein the pause command indicates that the at least one playback device is to cease playback of the audio information; subsequent to receiving the pause command, receive a resume command; based on the resume command, identify a range of frames previously transmitted by the device to the at least one playback device, wherein the range of frames have playback timing information subsequent to a time that the device received the pause command; and based on the resume command, instruct the at least one playback device to (i) update the playback timing information in the range of frames, and (ii) play the audio information.

In some embodiments, the device instructs the at least one playback device to update the playback timing information in the range of frames when the range of frames is above a threshold number of frames.

In some embodiments, the audio information is received in a first audio stream by the device prior to transmission, by the device, to the at least one playback device.

In some embodiments, the first audio stream is associated with a first cryptographic key.

In some embodiments, the instructions cause the device to terminate, based on the pause command, reception of the first audio stream.

In some embodiments, the instructions cause the device to, based on the resume command, initiate reception of the audio information in a second audio stream; determine whether the second audio stream is associated with the first cryptographic key or with a different cryptographic key; and when the second audio stream is associated with the different cryptographic key, provide the different cryptographic key to the at least one playback device.

In some embodiments, the device comprises a playback device, and wherein the master clock comprises a clock associated with the device, and the instructions cause the device to: based on the resume command, play the audio information synchronously with the at least one playback device.

An example embodiment of a computing device implemented in accordance with the present disclosure includes a processor, the computing device arranged to: transmit, to at least one playback device, a plurality of frames, each frame of the plurality of frames comprising audio information and playback timing information, the playback timing information identifying a time to play the audio information of the respective frame, wherein the playback timing information comprises a time relative to a master clock; receive a pause command, wherein the pause command indicates that the at least one playback device is to cease playback of the audio information; subsequent to receiving the pause command, receive a resume command; based on the resume command, identify a range of frames previously transmitted by the device to the at least one playback device, wherein the range of frames have playback timing information subsequent to a time that the device received the pause command; and based on the resume command, instruct the at least one playback device to (i) update the playback timing information in the range of frames, and (ii) play the audio information.

In some embodiments, the audio information is received in a first audio stream by the device prior to transmission, by the device, to the at least one playback device.

In some embodiments, the first audio stream is associated with a first cryptographic key.

In some embodiments, the device is further arranged to terminate, based on the pause command, reception of the first audio stream. In some embodiments, the device is further arranged to: based on the resume command, initiate reception of the audio information in a second audio stream; determine whether the second audio stream is associated with the first cryptographic key or with a different cryptographic key; and when the second audio stream is associated with the different cryptographic key, provide the different cryptographic key to the at least one playback device.

In some embodiments, the device comprises a playback device, and wherein the master clock comprises a clock associated with the device, and wherein the computing device is further arranged to: based on the resume command, play the audio information synchronously with the at least one playback device.

An example embodiment of a method implemented in accordance with the present disclosure includes transmitting, by a device to at least one playback device, a plurality of frames, each frame of the plurality of frames comprising audio information and playback timing information, the playback timing information identifying a time to play the audio information of the respective frame, wherein the playback timing information comprises a time relative to a master clock; receiving, by the device, a pause command, wherein the pause command indicates that the at least one playback device is to cease playback of the audio information; subsequent to receiving the pause command, receiving, by the device, a resume command; based on the resume command, identifying, by the device, a range of frames maintained on the device, wherein the range of frames have playback timing information subsequent to a time that the device received the pause command; and based on the resume command, (i) updating, by the device, the playback timing information in the range of frames, and (ii) transmitting, by the device, updated frames to the at least one playback device.

In some embodiments, the master clock comprises a clock associated with the device.

In some embodiments, the audio information is received in a first audio stream by the device prior to transmission, by the device, to the at least one playback device.

In some embodiments, the first audio stream is associated with a first cryptographic key.

In some embodiments, the method further includes, based on the pause command, terminating, by the device, reception of the first audio stream. In some embodiments, the method further includes: based on the resume command, initiating reception, by the device, of the audio information in a second audio stream; determining, by the device, whether the second audio stream is associated with the first cryptographic key or with a different cryptographic key; and when the second audio stream is associated with the different cryptographic key, providing, by the device, the different cryptographic key to the at least one playback device.

In some embodiments, the device comprises a playback device, and the method further includes, based on the resume command, playing, by the device, the audio information synchronously with the at least one playback device.

An example embodiment of a non-transitory computer-readable storage medium implemented in accordance with the present disclosure includes a set of instructions for execution by a processor, the set of instructions, when executed cause a device to: transmit to at least one playback device, a plurality of frames, each frame of the plurality of frames comprising audio information and playback timing information, the playback timing information identifying a time to play the audio information of the respective frame, wherein the playback timing information comprises a time relative to a master clock; receive a pause command, wherein the pause command indicates that the at least one playback device is to cease playback of the audio information; subsequent to receiving the pause command, receive a resume command; based on the resume command, identify a range of frames maintained on the device, wherein the range of frames have playback timing information subsequent to a time that the device received the pause command; and based on the resume command, (i) update the playback timing information in the range of frames, and (ii) transmit updated frames to the at least one playback device.

In some embodiments, the master clock comprises a clock associated with the device.

In some embodiments, the audio information is received in a first audio stream by the device prior to transmission, by the device, to the at least one playback device.

In some embodiments, the first audio stream is associated with a first cryptographic key.

In some embodiments, the instructions further cause the device to terminate, based on the pause command, reception of the first audio stream.

In some embodiments, the instructions further cause the device to, based on the resume command, initiate reception of the audio information in a second audio stream; determine whether the second audio stream is associated with the first cryptographic key or with a different cryptographic key; and when the second audio stream is associated with the different cryptographic key, provide the different cryptographic key to the at least one playback device.

In some embodiments, the device comprises a playback device, and the instructions further cause the device to: based on the resume command, play the audio information synchronously with the at least one playback device.

An example embodiment of a computing device implemented in accordance with the present disclosure includes a processor, the computing device arranged to: transmit to at least one playback device, a plurality of frames, each frame of the plurality of frames comprising audio information and playback timing information, the playback timing information identifying a time to play the audio information of the respective frame, wherein the playback timing information comprises a time relative to a master clock; receive a pause command, wherein the pause command indicates that the at least one playback device is to cease playback of the audio information; subsequent to receiving the pause command, receive a resume command; based on the resume command, identify a range of frames maintained on the device, wherein the range of frames have playback timing information subsequent to a time that the device received the pause command; and based on the resume command, (i) update the playback timing information in the range of frames, and (ii) transmit updated frames to the at least one playback device.

In some embodiments, the master clock comprises a clock associated with the device.

In some embodiments, the first audio stream is associated with a first cryptographic key.

In some embodiments, the computing device is further arranged to terminate, based on the pause command, reception of the first audio stream.

In some embodiments, the computing device is further arranged to, based on the resume command, initiate reception of the audio information in a second audio stream; determine whether the second audio stream is associated with the first cryptographic key or with a different cryptographic key; and when the second audio stream is associated with the different cryptographic key, provide the different cryptographic key to the at least one playback device.

In some embodiments, the device comprises a playback device, and is further arranged to: based on the resume command, play the audio information synchronously with the at least one playback device.

An example embodiment of a method implemented in accordance with the present disclosure includes receiving, by a playback device from a device, a plurality of frames, each frame of the plurality of frames comprising audio information and playback timing information, the playback timing information identifying a time to play the audio information of the respective frame; receiving, by the playback device, a pause command, the pause command indicating that playback of the audio information is to be ceased; based on the received pause command, ceasing playback, by the playback device, of the audio information at a specified pause time; subsequent to receiving the pause command, maintaining, by the playback device, at least a portion of the plurality of frames received from the device having playback timing information subsequent to the specified pause time; subsequent to receiving the pause command, receiving, by the playback device, a command to resume playback; and based on the command to resume playback, (i) updating, by the playback device, the playback timing information of the at least a portion of the plurality of frames received from the device, and (ii) playing, by the playback device, the audio information based on the updated playback timing information.

In some embodiments, the specified pause time is included in the pause command.

In some embodiments, the command to resume playback identifies the playback timing information of the at least a portion of the plurality of frames received from the device.

In some embodiments, the command to resume playback further identifies a specified time to resume playback.

In some embodiments, the playback device determines a time offset between itself and the device.

In some embodiments, wherein the playback device updates timestamps based on the offset.

In some embodiments, wherein the device comprises a second playback device.

An example embodiment of a non-transitory computer-readable storage medium implemented in accordance with the present disclosure includes a set of instructions for execution by a processor, the set of instructions, when executed cause a device to: receive from a device, a plurality of frames, each frame of the plurality of frames comprising audio information and playback timing information, the playback timing information identifying a time to play the audio information of the respective frame; receive a pause command, the pause command indicating that playback of the audio information is to be ceased; based on the received pause command, cease playback of the audio information at a specified pause time; subsequent to receiving the pause command, maintain at least a portion of the plurality of frames received from the device having playback timing information subsequent to the specified pause time; subsequent to receiving the pause command, receive a command to resume playback; and based on the command to resume playback, (i) update the playback timing information of the at least a portion of the plurality of frames received from the device, and (ii) play the audio information based on the updated playback timing information.

In some embodiments, the specified pause time is included in the pause command.

In some embodiments, the command to resume playback identifies the playback timing information of the at least a portion of the plurality of frames received from the device.

In some embodiments, the command to resume playback further identifies a specified time to resume playback.

In some embodiments, the playback device determines a time offset between itself and the device.

In some embodiments, the playback device updates timestamps based on the offset.

In some embodiments, the device comprises a second playback device.

An example embodiment of a playback device implemented in accordance with the present disclosure includes a processor, the playback device arranged to: receive from a device, a plurality of frames, each frame of the plurality of frames comprising audio information and playback timing information, the playback timing information identifying a time to play the audio information of the respective frame; receive a pause command, the pause command indicating that playback of the audio information is to be ceased; based on the received pause command, cease playback of the audio information at a specified pause time; subsequent to receiving the pause command, maintain at least a portion of the plurality of frames received from the device having playback timing information subsequent to the specified pause time; subsequent to receiving the pause command, receive a command to resume playback; and based on the command to resume playback, (i) update the playback timing information of the at least a portion of the plurality of frames received from the device, and (ii) play the audio information based on the updated playback timing information.

In some embodiments, the specified pause time is included in the pause command.

In some embodiments, the command to resume playback identifies the playback timing information of the at least a portion of the plurality of frames received from the device.

In some embodiments, the command to resume playback further identifies a specified time to resume playback.

In some embodiments, the playback device determines a time offset between itself and the device.

In some embodiments, the playback device updates timestamps based on the offset.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, though the home could have been configured with only one zone. Additionally, one or more zones can be added over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. A zone player 102-124, also referred to herein as a playback device, multimedia unit, speaker, player, and so on, provides audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
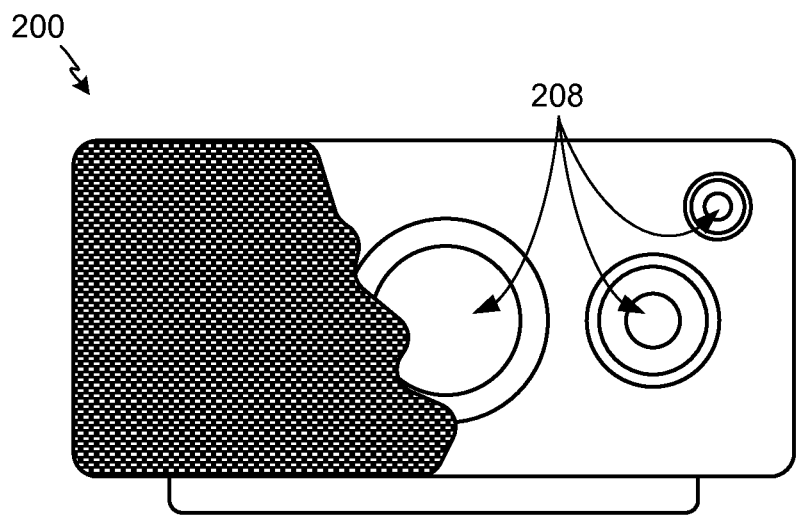
FIG. 2A shows an illustration of an example zone player having a built-in amplifier and transducers.
Figure 2B:
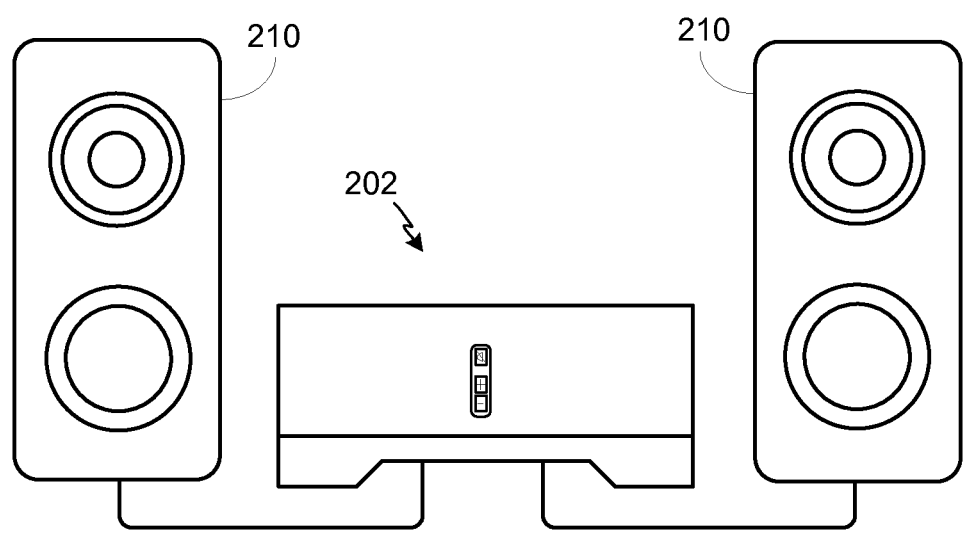
FIG. 2B shows an illustration of an example zone player having a built-in amplifier and connected to external speakers.
Figure 2C:
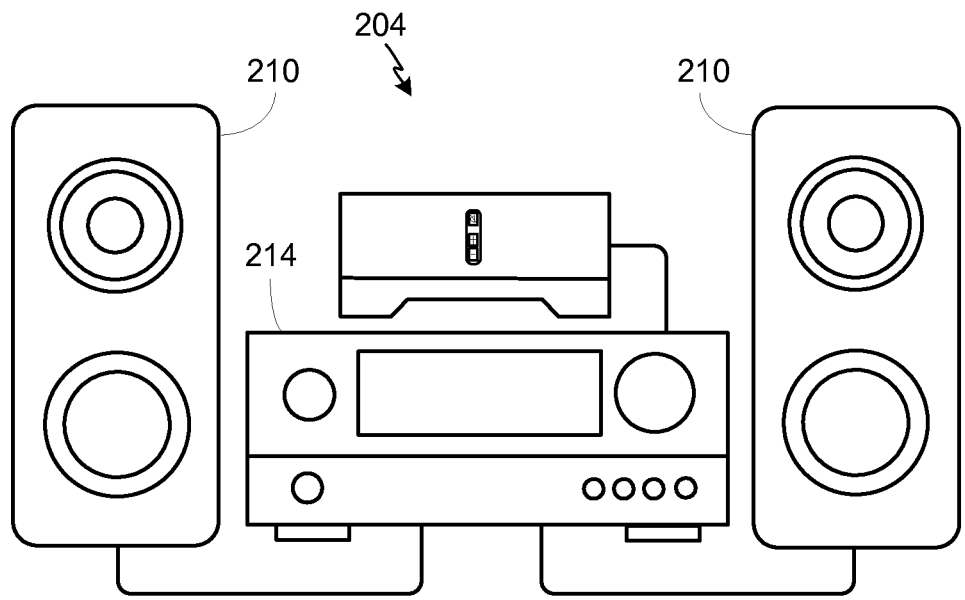
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more audio items for playback by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, playlist, or other some other representation. A user can populate the playback queue with audio items of interest. The user may also modify and clear the playback queue, if so desired.

By way of illustration, SONOS, Inc. of Santa Barbara, Calif. presently offers for sale zone players referred to as a "PLAY:5," "PLAY:3," "PLAYBAR," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple IPOD™ or similar device.

b. Example Controllers

Figure 3:
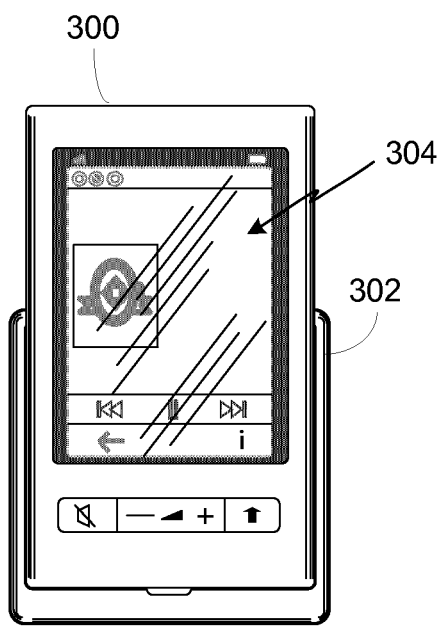
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, a "bonded zone" is a zone that contains two or more zone players, such as the two zone players 106 and 108 in the family room, whereby the two zone players 106 and 108 can be configured to play the same audio source in synchrony. In one example, the two zone players 106 and 108 can be paired to play two separate sounds in left and right channels, for example. In other words, the stereo effects of a sound can be reproduced or enhanced through the two zone players 106 and 108, one for the left sound and the other for the right sound. In another example, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player has additional speaker drivers from which sound can be passed. The consolidated zone player can further be paired with a single zone player or yet another consolidated zone player. Each playback device of a consolidated playback device can be set in a consolidated mode, for example.

In certain embodiments, paired or consolidated zone players (also referred to as "bonded zone players") can play audio in synchrony with other zone players in the same or different zones.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. Example Zone Players

Figure 4:
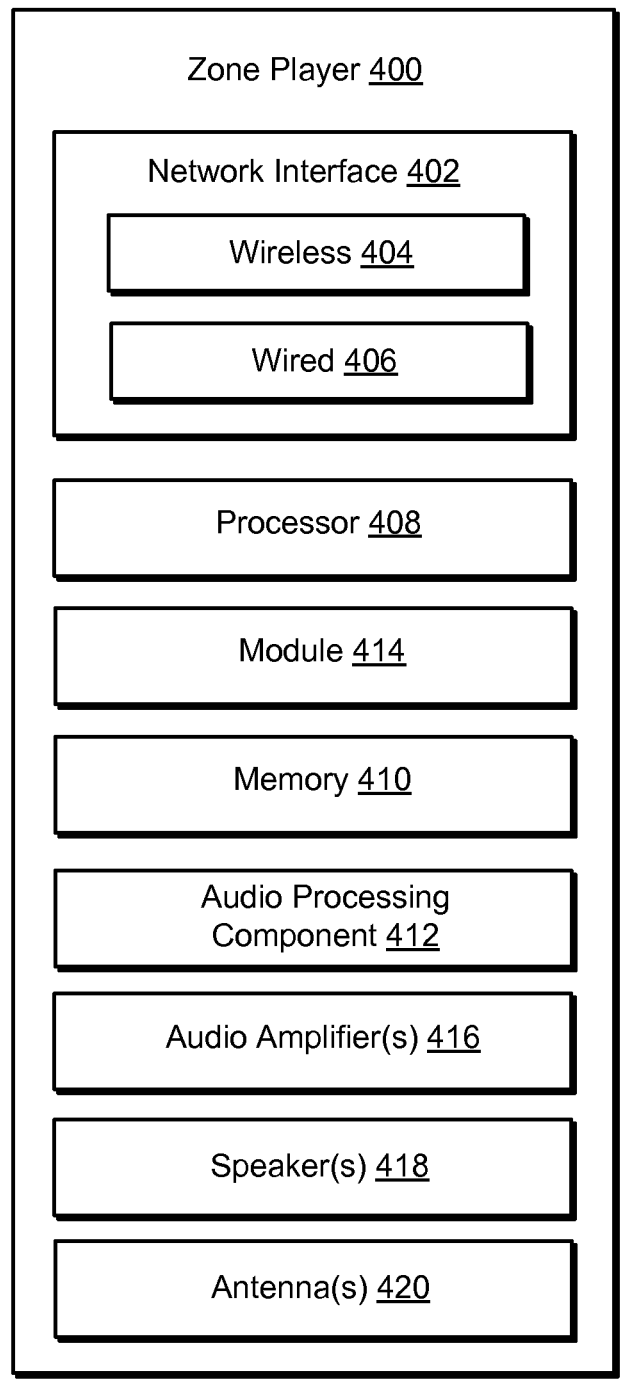
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5™, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™

IV. Example Controller

Figure 5:
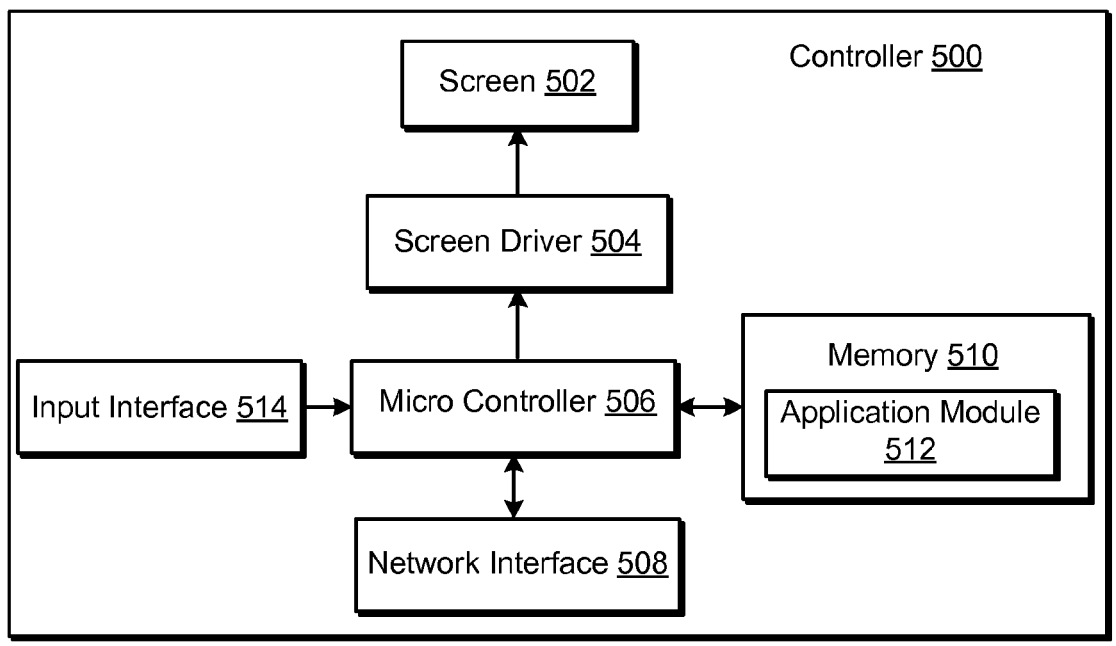
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 502 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio playback. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™, IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to or otherwise associated with a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a "family room+dining room" playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
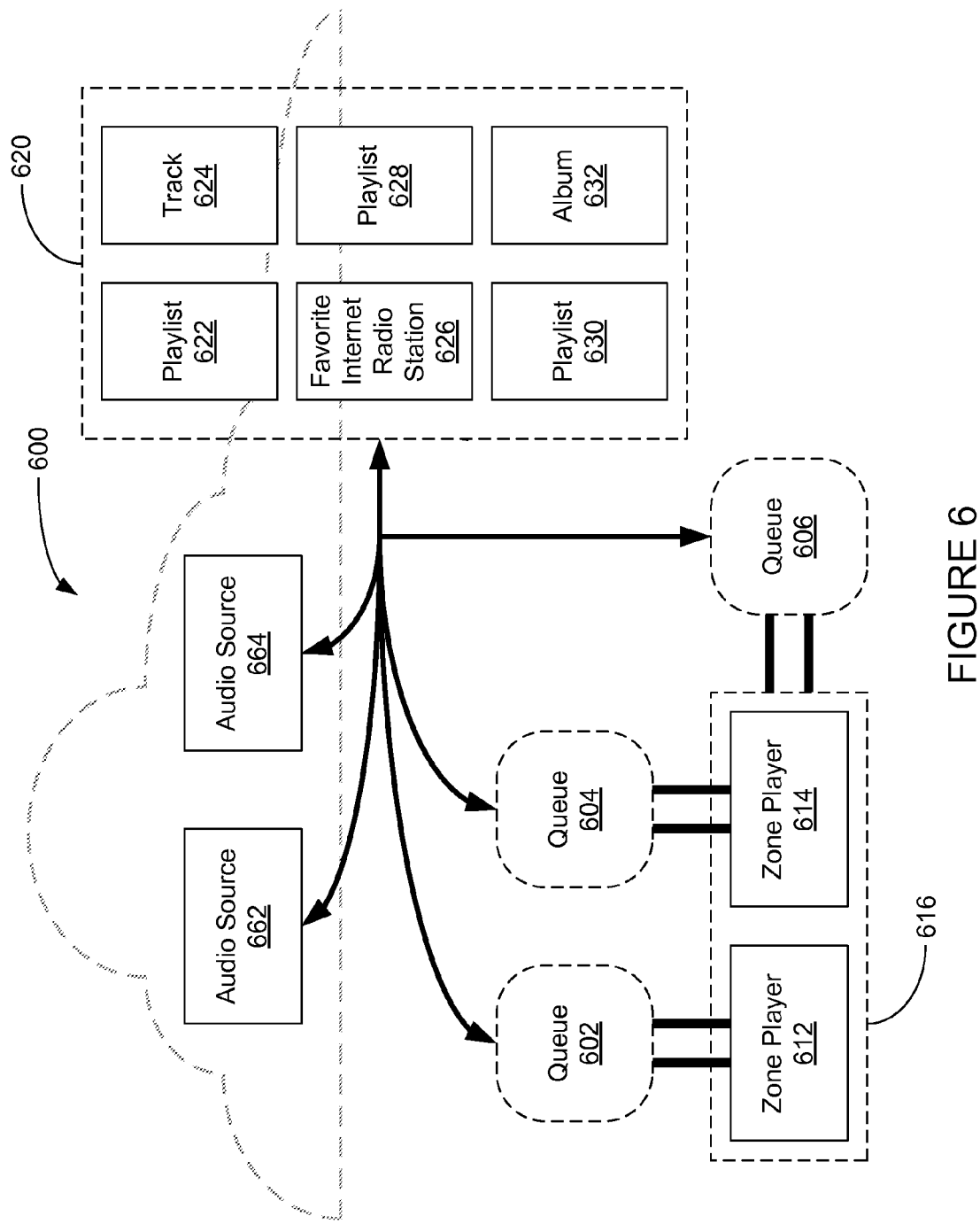
FIG. 6 shows an example network for media content playback.

By way of illustration, FIG. 6 shows an example network 600 for media content playback. As shown, the example network 600 includes example zone players 612 and 614, example audio sources 662 and 664, and example media items 620. The example media items 620 may include playlist 622 (e.g., a collection of audio tracks), track 624 (e.g., a song, an audio book or chapter, a program, etc.), favorite Internet radio station 626 (e.g., a stream of audio tracks), playlists 628 and 630, and album 632 (e.g., an ordered collection of audio tracks). In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (e.g., URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602, 604, 606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. Example Ad-Hoc Network

Figure 7:
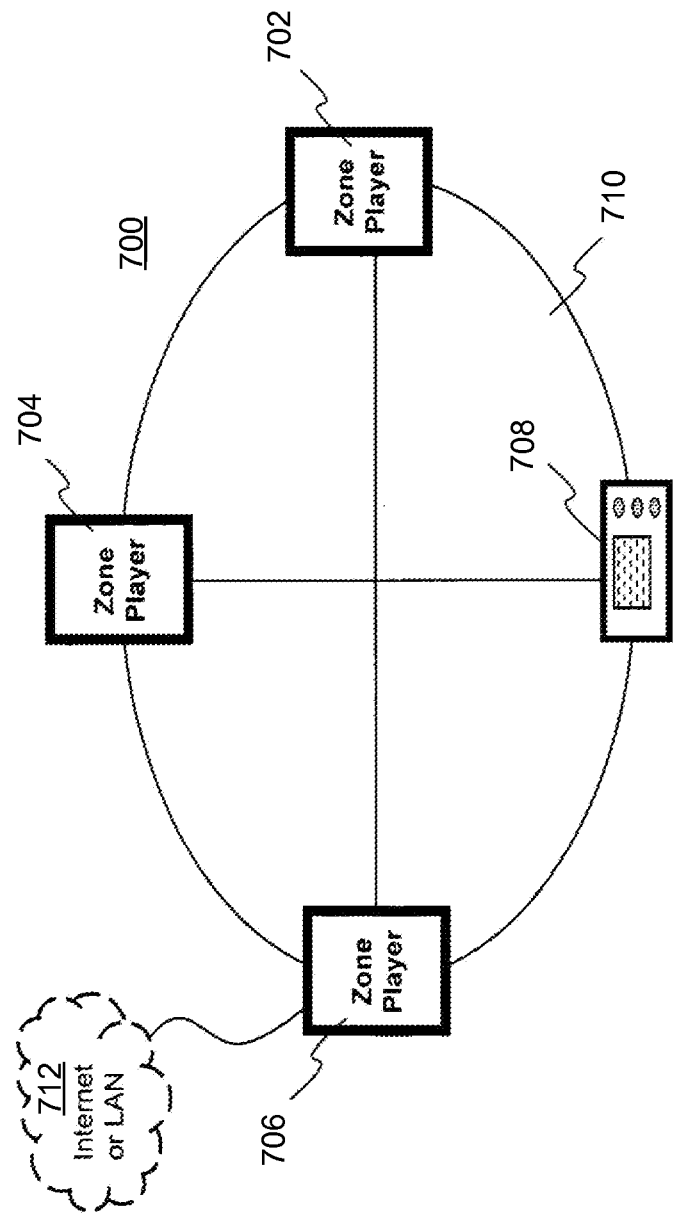
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 700 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 708) also running a CP application module, for example. The zone player is any other device on the network that is placed to participate in the automatic configuration process. The ZP, as a notation used herein, includes the controller 708 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. Another Example System Configuration

Figure 8:
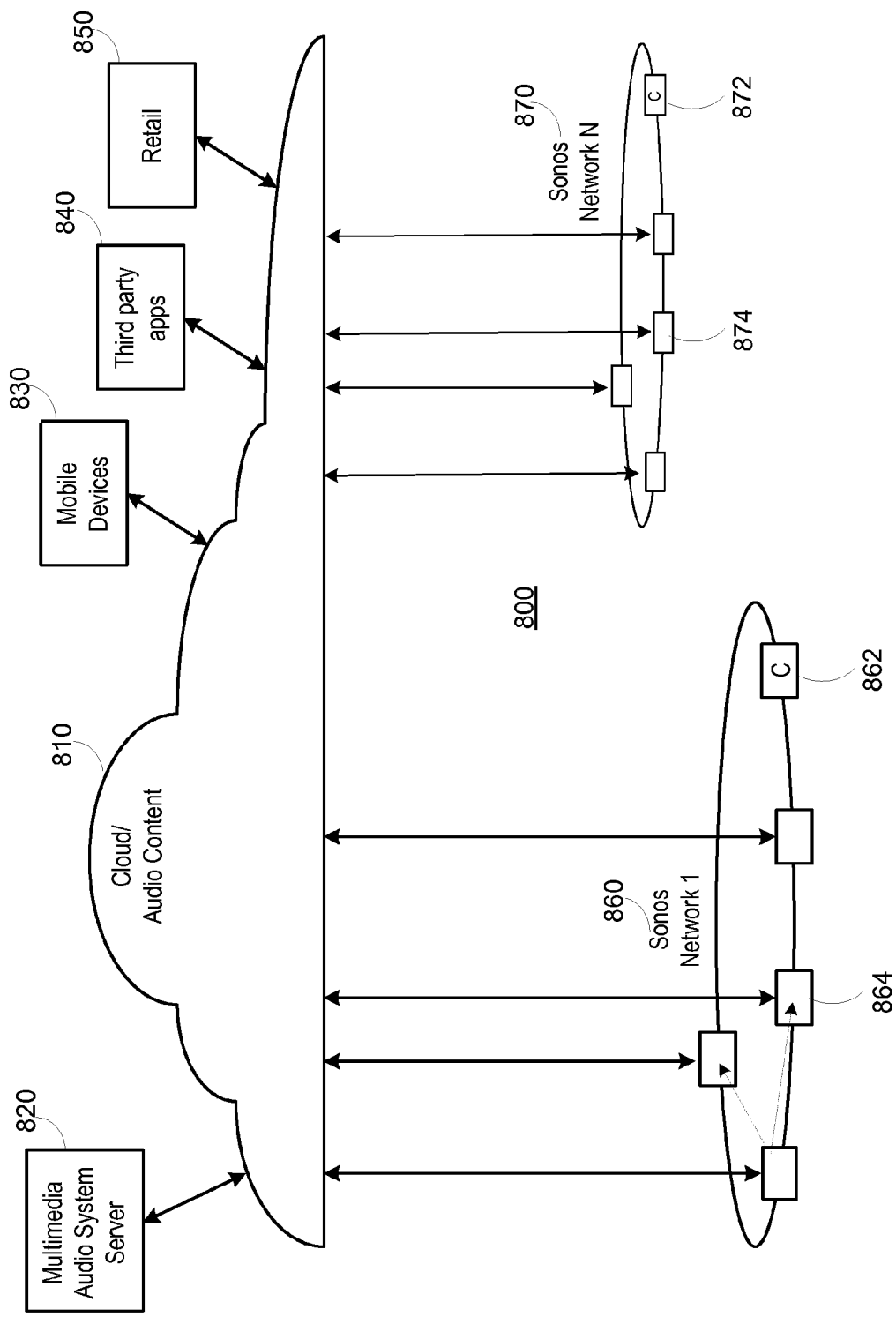
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. Reducing Time-to-Music for Grouped Playback Devices

Known methods to resume playback for grouped devices, such that resuming audio playback is synchronous among the devices of the group, may incur a delay (e.g., several seconds) from receipt of the resume command until audio is output. The delay resulting from known methods of resuming playback may be larger for groups containing a large number of playback devices, because the known methods invalidate and/or remove the audio data from the buffers (e.g., buffers from which audio is processed for actual playback) when playback is paused or stopped. Known methods require refilling the buffers and re-transmitting the audio to all playback devices in the group prior to resuming the audio.

In contrast to known methods of resuming playback, example methods and apparatus disclosed herein reduce the time-to-music (e.g., reduced delays between a resume command and the actual output of sound) for grouped players by using the audio data that was previously stored in the buffers of a group coordinator device and/or of the playback devices at the time the audio playback was paused or stopped.

Figure 9:
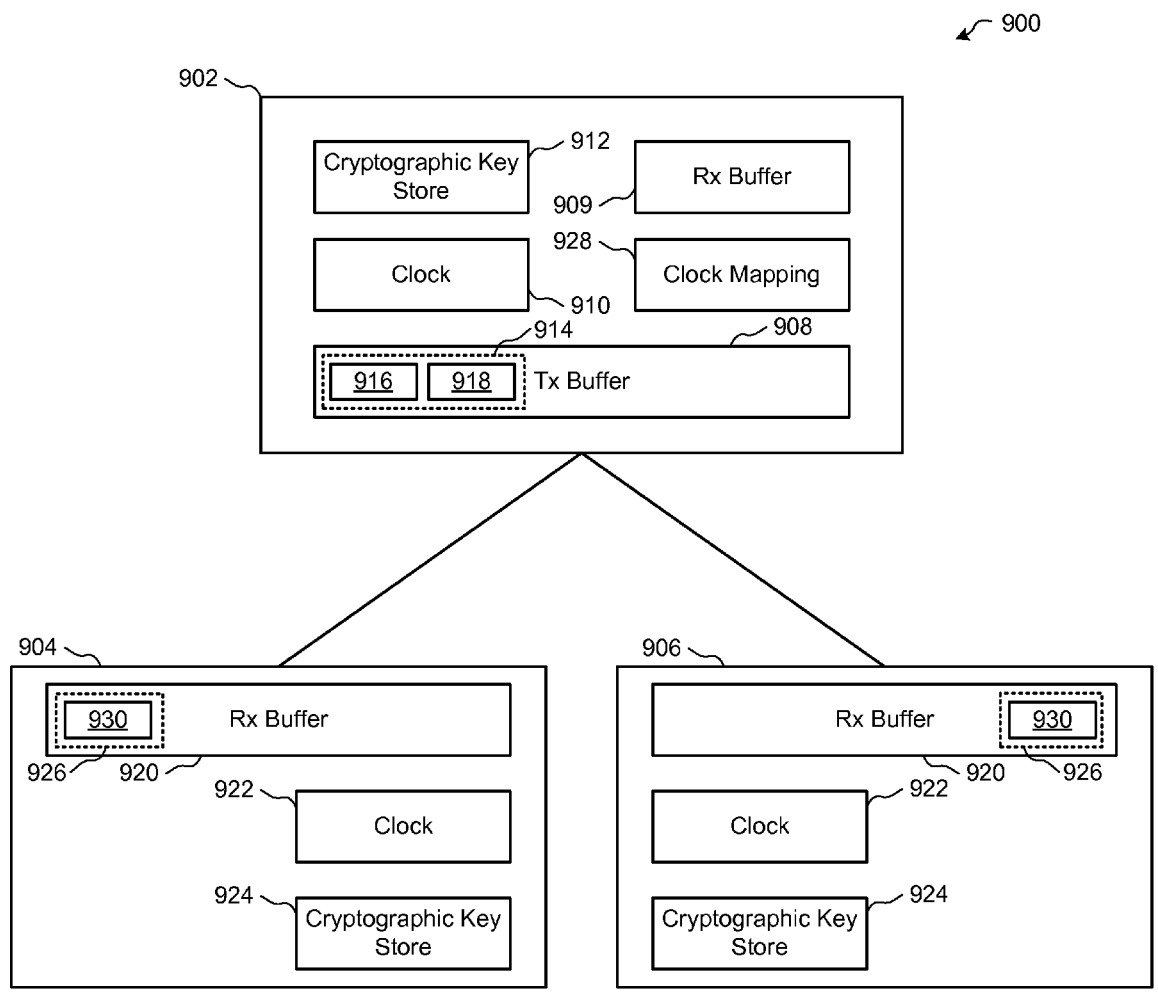
FIG. 9 is a block diagram of an example playback group including a group coordinator device and group member playback devices.

FIG. 9 is a block diagram of an example playback group 900 including a group coordinator (GC) device 902 and group member playback devices 904, 906. The example group coordinator device 902 and/or the example group member playback devices 904, 906 may be implemented using multiple devices, such as, for example, the zone players 102-124 of FIG. 1, the zone players 200, 202, 204 of FIG. 2, the zone player 400 of FIG. 4, the zone players 612, 614 of FIG. 6, the zone players 702-706 of FIG. 7, and/or the playback devices 864, 874 of FIG. 8. The example playback group 900 may include more or fewer group member playback devices 904, 906. The playback group 900 may be the local playback networks 860, 870 and/or the network 710.

Any of the example devices 902-906 may be the only playback device in a network or household playing a particular audio stream, or multiple ones of the devices 902-906 may be playing the stream simultaneously (e.g., as a zone group, bonded zone, etc.). To facilitate these playback scenarios, the playback process is divided between a channel source and one or more channel sink(s). The group coordinator 902 functions as the channel source and retrieves an audio stream (e.g., from a content provider and/or a device on a local network) by setting up the communications resource(s), receiving the content data packets over an interface (e.g., a wired interface, a wireless interface, etc.), determining a compression and/or coding format of the received content, handling metadata associated with the content, and/or otherwise preparing the content for playback. The GC 902 also prepares the audio frames/packets/samples for transmission or provision to the channel sinks.

The playback devices 904, 906 function as channel sinks that decode audio data (received from the GC 902) into pulse-code modulation (PCM) samples, for example, and render the PCM samples (e.g., to electrical/optical audio outputs and/or into actual sound via drivers). In some examples, the GC 902 is also a playback device (e.g., a channel sink). If content is playing on all of the example playback devices 902-906, the channel source and channel sink processes execute in the GC 902 and the remaining playback devices 904, 906 in the group are channel sinks. The playback devices 904, 906 are also referred to herein as group members (GMs) and/or grouped playback devices. When the GC 902 receives audio data, the GC 902 provides the data to the playback devices 904, 906 in the playback group (including itself, if applicable). Each playback device 904, 906 runs the channel sink process and renders the audio in synchrony as described below.

The example GC 902 includes a transmit (Tx) buffer 908, an Rx buffer 909, a clock 910, and a cryptographic key store 912. The example Tx buffer 908 temporarily stores packets and/or frames (e.g., data packets of multiple audio frames) for transmission to the playback devices 904, 906. The frames 914 stored in the Tx buffer 908 include audio data 916 to be played. Each of the frames 914 stored in the Tx buffer 908 is associated with playback timing information (e.g., a timestamp 918) that indicates a time at which the audio data 916 in the respective packet or frame 914 is to be played by the devices 902-906. When stored in the Tx buffer 908, the timestamp 918 is referenced to the clock 910 of the GC 902. When received at the playback devices 904, 906 as part of the frame 914, the playback devices 904, 906 translate the example timestamp 918 to reference the respective clocks of the playback devices 904, 906. Translation is based on an offset between the clock 910 and a clock 922 determined during a synchronization routine, for example.

The example playback devices 904, 906 each include a receive (Rx) buffer 920, a clock 922, and a cryptographic key store 924. The Rx buffer 920 stores frames or packets received from the GC 902, such as command packets and/or frames of audio to be played.

The example clocks 910, 922 (also referred to herein as "codec clocks") are derived from an oscillator that may run the audio codec in each player. In certain examples, the clocks 910, 922 are not set to a meaningful time of day, but rather keep time (e.g., in seconds, in microseconds, in oscillator cycles, etc.) from when the GC 902 or playback device 904, 906 is first powered on (e.g., booted up from a powered off state). Additionally or alternatively, the clocks 910, 922 may synchronize to a designated value (e.g., 0). In this manner, the clocks 910, 922 function like an oscillator-triggered counter. Each of the clocks 910, 922 will likely return very different times even if called simultaneously. To perform synchronized playback despite different clock values, the playback devices 904, 906 maintain respective clock offset time values from the clock 910 time value using, for example, simple network time protocol (SNTP).

The cryptographic key store 924 stores cryptographic keys received from the GC 902 and/or another source to be used for decrypting the audio frames. Some music sources provide encrypted audio information and corresponding decryption keys. In situations in which the audio frames in the Rx buffer 920 are re-time stamped for subsequent playback, the cryptographic key store 924 may store the cryptographic keys received in association with the audio frames for subsequent decryption. The cryptographic keys for audio stored in the Rx buffer 920 prior to a pause command may be identified or marked separately from cryptographic keys for audio stored subsequent to the pause command and a corresponding resume command. The cryptographic keys in the cryptographic keys store 924 are linked to the audio frames (e.g., via a pointer associated with (e.g., received with) the cryptographic key and/or a pointer associated with (e.g., received with) the audio information. Each stream of audio information may be associated with their respective cryptographic keys at the devices 904, 906 so that the keys are not discarded due to their age and/or so the audio information can be decrypted at a later time.

While an example manner of implementing the playback group 900 is illustrated in FIG. 9, one or more of the elements, processes and/or devices illustrated in FIG. 9 may be combined, divided, re-arranged, omitted, eliminated and/or implemented in any other way. Further, the example GC 902, the playback devices 904, 906, the example Tx buffers 908, the example Rx buffers 909, 920, the example clocks 910, 922, the example cryptographic key stores 912, 924, the example clock mapping 928 and/or, more generally, the example playback group 900 may be implemented by hardware, software, firmware and/or any combination of hardware, software and/or firmware. Thus, for example, any of the example GC 902, the playback devices 904, 906, the example Tx buffers 908, the example Rx buffers 909, 920, the example clocks 910, 922, the example cryptographic key stores 912, 924, the example clock mapping 928 and/or, more generally, the example playback group 900 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example GC 902, the playback devices 904, 906, the example Tx buffers 908, the example Rx buffers 909, 920, the example clocks 910, 922, the example cryptographic key stores 912, 924, and/or the example clock mapping 928 is/are hereby expressly defined to include a tangible computer readable storage device or storage disk such as a memory, a digital versatile disk (DVD), a compact disk (CD), a Blu-ray disk, etc. storing the software and/or firmware. Further still, the example playback group 900 of FIG. 9 may include one or more elements, processes and/or devices in addition to, or instead of, those illustrated in FIG. 9, and/or may include more than one of any or all of the illustrated elements, processes and devices.

Flowcharts representative of example machine-readable instructions for implementing the playback group 900 of FIG. 9 are shown in FIGS. 10-13. In this example, the machine readable instructions comprise program(s) for execution by a processor such as the processor 408 shown in the example processor platform zone player 400 discussed above in connection with FIG. 4. The program(s) may be embodied in software stored on a tangible computer readable storage medium such as a CD-ROM, a floppy disk, a hard drive, a digital versatile disk (DVD), a Blu-ray disk, or a memory associated with the processor 408, but the entire programs and/or parts thereof could alternatively be executed by a device other than the processor 408 and/or embodied in firmware or dedicated hardware. Further, although the example programs are described with reference to the flowcharts illustrated in FIG. 4, many other methods of implementing the example playback group 900 may alternatively be used. For example, the order of execution of the blocks may be changed, and/or some of the blocks described may be changed, eliminated, or combined.

As mentioned above, the example processes of FIGS. 10-13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 10-13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 10:
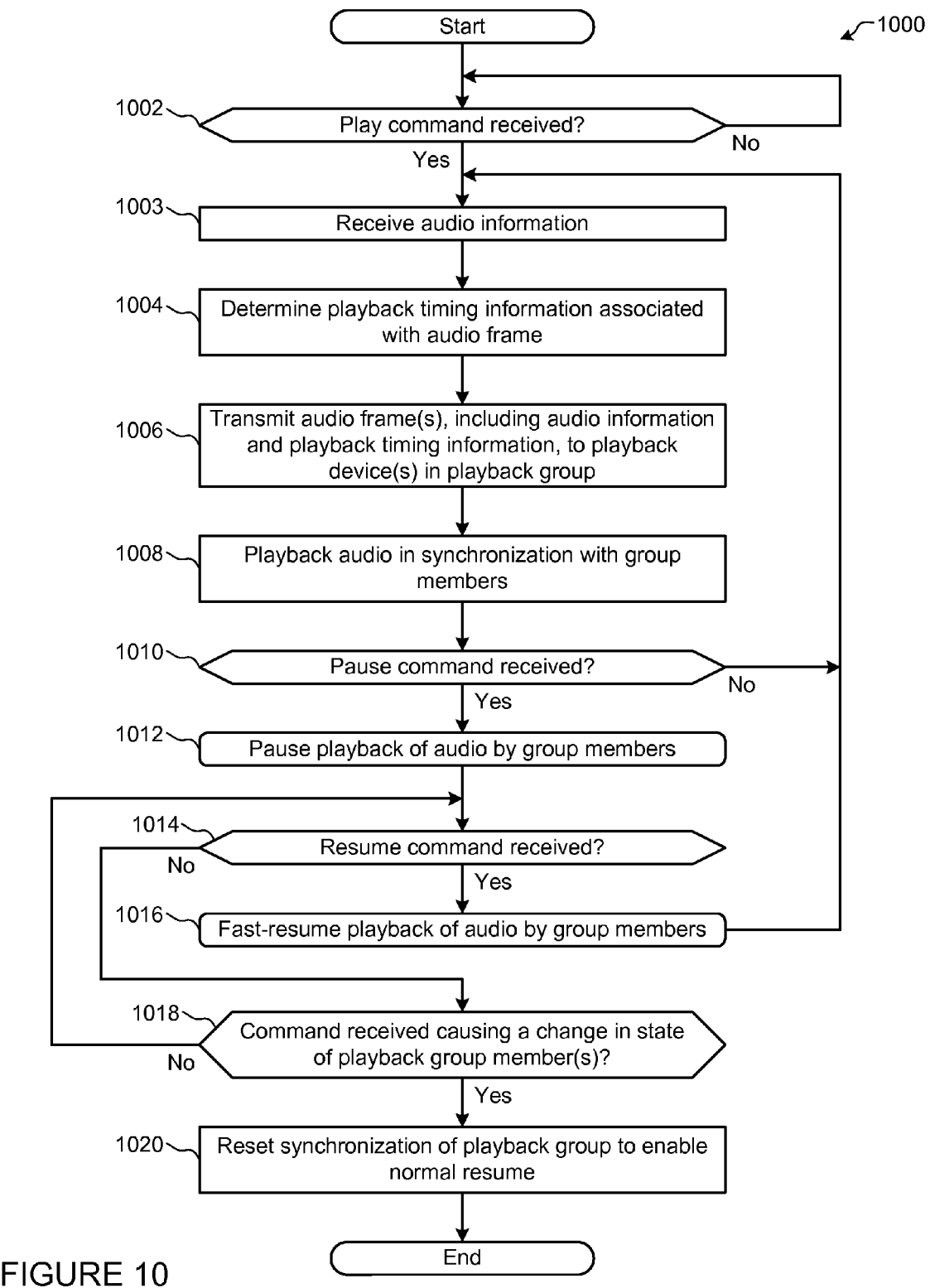
FIG. 10 is a flowchart illustrating an example process to begin, pause, and resume audio playback.

FIG. 10 is a flowchart illustrating an example process 1000 to begin, pause, and resume audio playback. The example process 1000 of FIG. 10 will be described with reference to the example playback group 900 and the GC 902 of FIG. 9.

The example GC 902 of FIG. 9 determines whether a play command (e.g., a command to playback audio) has been received (block 1002). For example, the GC 902 may receive the play command from a controller (e.g., the controller 500 of FIG. 5) via the wireless interface 404 or the wired interface 406 of FIG. 4. If a play command has not been received (block 1002), control loops to block 1002 to await a play command.

When a play command is received (block 1002), the GC 902 begins retrieving audio information (e.g., from an audio source) (block 1003). For example, the GC 902 may retrieve audio data from any of the sources 662, 664 of FIG. 6 and/or the sources 810, 820, 830 of FIG. 8. The GC 902 determines playback timing information (e.g., the timestamp 918 of FIG. 9) associated with an audio frame (e.g., the audio frame 914 of FIG. 9) (block 1004). For example, if the program is about to start playing, the GC 902 estimates how far in the future the program should be played. In estimating, the GC 902 may account for the time required to process and distribute the data. GC 902 may also account for the time required for the playback devices receiving the audio data (in this example, devices 904 and 906) to process the audio data for playing. The GC 902 then reads the clock 910, adds the offset, and timestamps the packet with the resulting sum of the time and offset (e.g., the "time-to-play" to packet of audio data). The audio frame 914 may be obtained from any audio source, such as the audio sources 810-850 of FIG. 8, and contains audio information 916 to be rendered into sound by the playback devices 902-906. The playback timing information (e.g., timestamp 918) specifies a time at which the playback devices 902-906 are to playback the audio information 916 in the audio frame 914. The timestamp 918 is referenced to the clock 910.

The GC 902 transmits the audio frame(s) 914, including the audio information 916 and the timestamp 918, to the playback devices 904, 906 in the playback group 900 (e.g., via the antenna 420 and/or the interfaces 402-406 of FIG. 4) (block 1006). As the audio is played, the GC 902 continues to stamp additional audio frames and/or packets with the time(s) at which the audio should be played. The frames 914 are placed into the Tx buffer 908. Data in the Tx buffer (e.g., the frames 914) are transmitted from the GC 902 to the playback devices 904, 906 wirelessly, for example. The playback devices 902-906 in the group 900 play the audio in synchronization (block 1008). To playback the audio in synchrony, the playback devices 904, 906 determine respective time offsets between their respective clocks 922 and the clock 910 of playback device 902, and update the received timestamp 918 with the offset. Additional examples of synchronized playback of audio by multiple playback devices in a playback group are described in U.S. Pat. No. 8,234,395, for example. U.S. Pat. No. 8,234,395, also assigned to SONOS, Inc., is incorporated by reference herein in its entirety.

At block 1010, the GC 902 determines whether a pause command (e.g., a command indicating that the devices 902-906 are to cease playback) has been received. In the example of FIG. 10, the pause command is distinguished from a "stop" command in that, upon resuming playback after a pause command, the devices 902-906 are to resume from the same time in the audio. The GC 902 may receive the pause command from a controller (e.g., the controller 500 of FIG. 5) via the wireless interface 404 or the wired interface 406 of FIG. 4. If a pause command has not been received (block 1010), control returns to block 1004 to continue determining playback timing information and transmitting audio frames to the GMs 904, 906.

When a pause command is received (block 1010), the example GC 902 pauses playback of the audio by the group members (block 1012). In response to the pause command, the GC 902 terminates reception of the audio stream. In the example of FIG. 9, the GC 902 prepares any untransmitted audio frames 914 in the Tx buffer 908 for a fast-resume, and commands the GMs 904, 906 to cease playback of the audio in synchrony and prepare any unplayed audio frames 926 in the Rx buffers 920 for a fast-resume. An example process to pause playback of audio is described below with reference to FIG. 11.

At block 1014, the GC 902 determines whether a resume command has been received. The GC 902 may, for example, receive the resume command from a controller (e.g., the controller 500 of FIG. 5) via the wireless interface 404 or the wired interface 406 of FIG. 4. If a resume command is received (block 1014), the GC 902 fast-resumes playback of audio by the playback group 900 (block 1016). Two example processes to fast-resume playback are described below with reference to FIG. 12 and FIG. 13.

If a resume command has not been received (block 1014), the GC 902 determines whether another command has been received that causes a change in state of one or more of the devices 902-906 in the playback group 900 (block 1018). For example, changes in the state of the devices 902-906 may include a change in the playback group 900 (e.g., adding or dropping devices), a change in audio source, a seek command to a different location the audio track than the location at which the audio track was paused, a fast-forward and/or rewind command, or any other state-changing command that would invalidate the audio data in the Rx buffers 920 and/or the Tx buffer 908. If no such state-changing command has been received (block 1018), control returns to block 1014 to determine whether a resume command has been received. If a state-changing command has been received (block 1018), the devices 902-906 in the playback group 900 reset a synchronization of the playback group, after which a resume command may be treated as a play command (e.g., block 1002) that may include a particular location in an audio track from which the audio is to resume. The example process 1000 of FIG. 10 ends.

Figure 11:
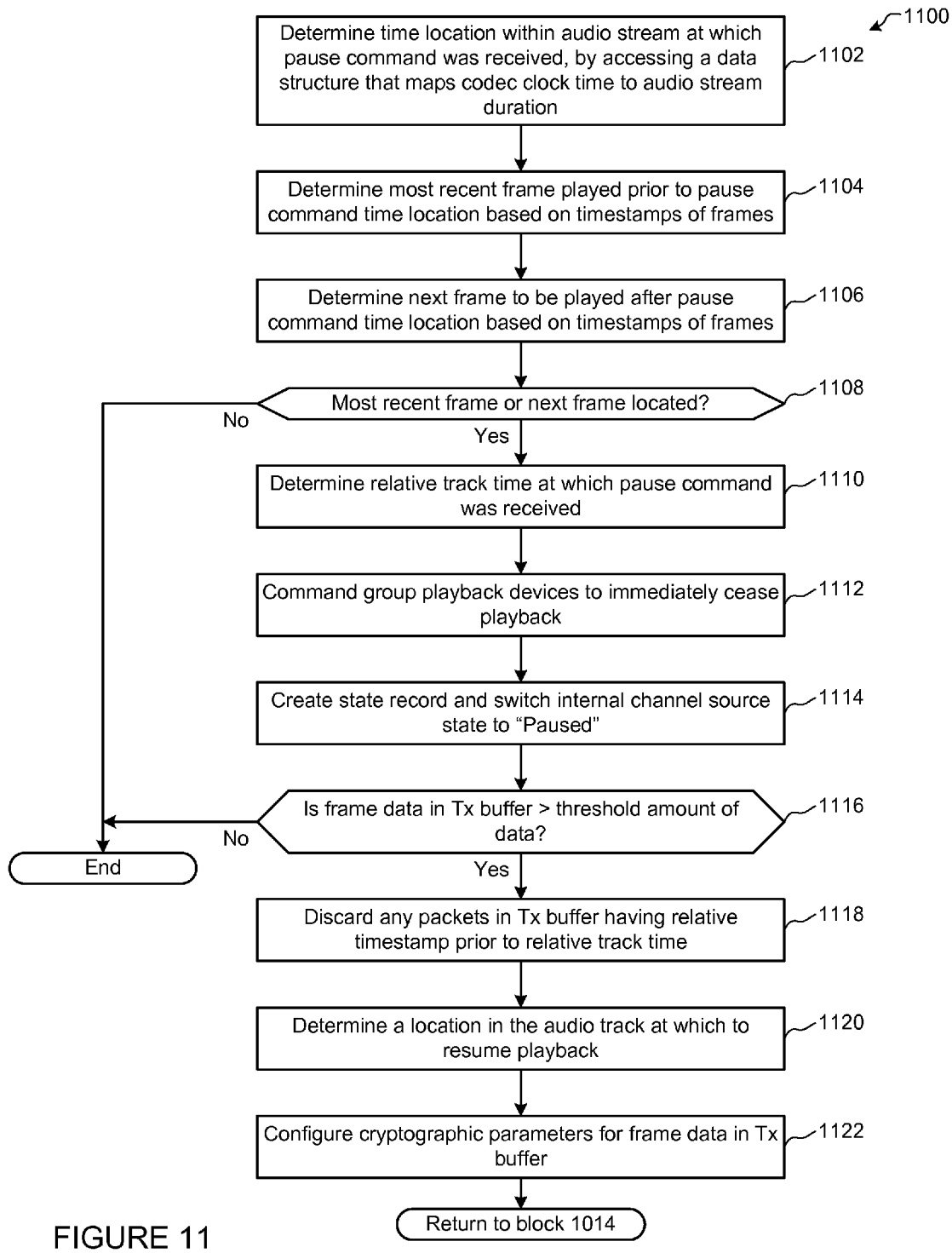
FIG. 11 is a flowchart illustrating an example process to pause playback of audio for devices in a playback group.

FIG. 11 is a flowchart illustrating an example process 1100 to pause playback of audio for devices (e.g., a GC 902 and GMs 904, 906) in a playback group (e.g., the playback group 900 of FIG. 9). The example process 1100 of FIG. 11 may be performed to implement block 1012 of FIG. 10 to pause playback of audio, for example. The example process 1100 of FIG. 11 will be described with reference to the example playback group 900 of FIG. 9 and the zone player 400 of FIG. 4.

The process 1100 of FIG. 11 begins when a pause command has been received by a GC (e.g., the GC 902 of FIG. 9). The example GC 902 determines a time location within an audio stream (e.g., 0:10 seconds from the beginning of an audio track) at which the pause command was received (block 1102). In the example of FIG. 9, the GC 902 accesses a clock mapping 928 that maps a start time of the currently-playing audio track to the clock 910 of the GC 902, determines a current time of the clock 910, and calculates a time within the currently-playing audio track at which the pause command was received. For example, if the clock mapping 928 maps the start time of the audio track to clock time 43565409 and the pause command was received at clock time 44095864, the GC 902 may determine the pause command to have been received X seconds into the audio track based on the speed of the clock 910.

The GC 902 determines a most recent frame (or packet) played prior to the pause command time location (determined in block 1102) based on the timestamps of the audio frames (block 1104). The GC 902 retains the audio frames 914 in the Tx buffer 908 until those audio frames have been played (or the timestamp for the audio frames 914 has occurred on the clock 910). The GC 902 searches the audio frames 914 contained in the Tx buffer 908 to identify an audio frame having a highest timestamp that is less than the pause command time. The identified frame is the most recent audio frame played by the playback group 900 prior to receiving the pause command. The GC 902 determines a next frame to be played after the pause command time location (determined in block 1102) based on the timestamps of the frames (block 1106). The GC 902 searches the audio frames 914 contained in the Tx buffer 908 to identify an audio frame having a lowest timestamp that is greater than the pause command time. The identified frame is the next audio frame to be played by the playback group 900 upon receiving a resume command.

The GC 902 determines whether a most recent frame (block 1104) or a next frame (block 1106) have been located (block 1108). If both the most recent frame and the next frame could not be located in the Tx buffer (block 1108), the example process 1100 ends because the GC 902 is not able to determine a location from which to resume. The example process 1000 of FIG. 10 may also be aborted to re-synchronize the playback group 900 for a subsequent play command. If the GC 902 locates the most recent frame (block 1104) or a next frame (block 1106), the GC 902 determines a relative track time (e.g., the point in time at which the audio track was paused with reference to the beginning of the currently-playing track) (block 1110). In contrast to the time location determined in block 1102 (e.g., a time of the clock 910), the relative track time is determined and/or expressed as a time or distance from the start of the audio track (e.g., 0:10 seconds, X clock cycles, Y audio frames, Z audio samples, etc.).

The GC 902 commands the group playback devices 902-906 to immediately cease playback (block 1112). For example, the GC 902 of FIG. 9 may insert a track boundary in the transmit data stream (e.g., a FRAME_TYPE_TRACK_BOUNDARY message), transmit the track boundary, and transmit a message indicating that that the playback devices should cease playback at a certain time (the message could be a resynchronization message of the type described in U.S. Pat. No. 8,234,395 discussed above). These messages cause the group of playback devices 904-906 to recognize and perform a synchronized stop in the audio playback with the GC 902.

The GC 902 and the playback devices 904, 906 create respective state records to change their internal channel source states to "Paused" (block 1114). The state records may be used for, for example, subsequent processing of other commands from the user and/or to identify an appropriate action (e.g., fast-resume) upon receiving a resume command.

At block 1116, the GC 902 determines whether frame data in the Tx buffer 908 is greater than a threshold amount of data. For example, the GC 902 may determine whether at least a threshold number of frames of audio for the paused audio track are stored in the Tx buffer 908. By determining that at least a threshold amount of audio is present in the Tx buffer 908, the GC 902 may avoid a situation in which a fast-resume occurs and the GC 902 subsequently runs out of audio to play before receiving additional audio information to continue playing the audio track. Such a lack of audio information following resuming playback can result in intermittent playback (e.g., starting, then stopping, then starting playback again in a short period of time) that may be undesirable or irritating to the user. In some examples, the GC 902 may fill the Tx buffer 908 with additional audio frames for the paused audio track prior to making the determination in block 1116 or after making the determination in block 1116.

If the frame data in the Tx buffer 908 is greater than a threshold amount (block 1116), the GC 902 may discard frames and/or packets in the Tx buffer 908 having a relative timestamp prior to the relative track time (i.e., the time determined in block 1110) (block 1118).

At block 1120, the GC 902 determines a location in the audio track (e.g., a frame, a time) at which to resume playback upon receipt of a resume command (block 1120). In some examples, the frames are obtained from an audio source in blocks or packets of multiple frames. In such examples, the GC 902 may determine a closest frame to the relative track time (e.g., a first block start location prior to or subsequent to the relative track time). In other examples, the audio frames may be individually accessible by the GC 902, and the GC 902 determines that the next frame to be played upon a resume command is the next frame determined from block 1106. Other examples are possible as well.

At block 1122, the GC 902 maintains the cryptographic parameters for the frames 914 in the Tx buffer 908. Some music sources may provide different cryptographic parameters for audio content following a resume playback command. In such a situation, frames 914 that are stored in the Tx buffer 908 prior to the pause command may have different cryptographic parameters than frames that are received upon resuming playback. As such, the cryptographic parameters received after the resume command may not be usable to decrypt the frames 914 encrypted using the prior cryptographic parameters. By maintaining the cryptographic parameters received prior to the pause commend, the players in group 900 can play back the buffered audio content even if the music source provides new cryptographic parameters after a resume command is received. Some audio sources do not use cryptography or provide cryptographic parameters. In the event that the frames 914 are not encrypted, the example GC 902 may omit or skip block 1122. After the example process 1100 ends, control returns to block 1014 of FIG. 10.

Figure 12:
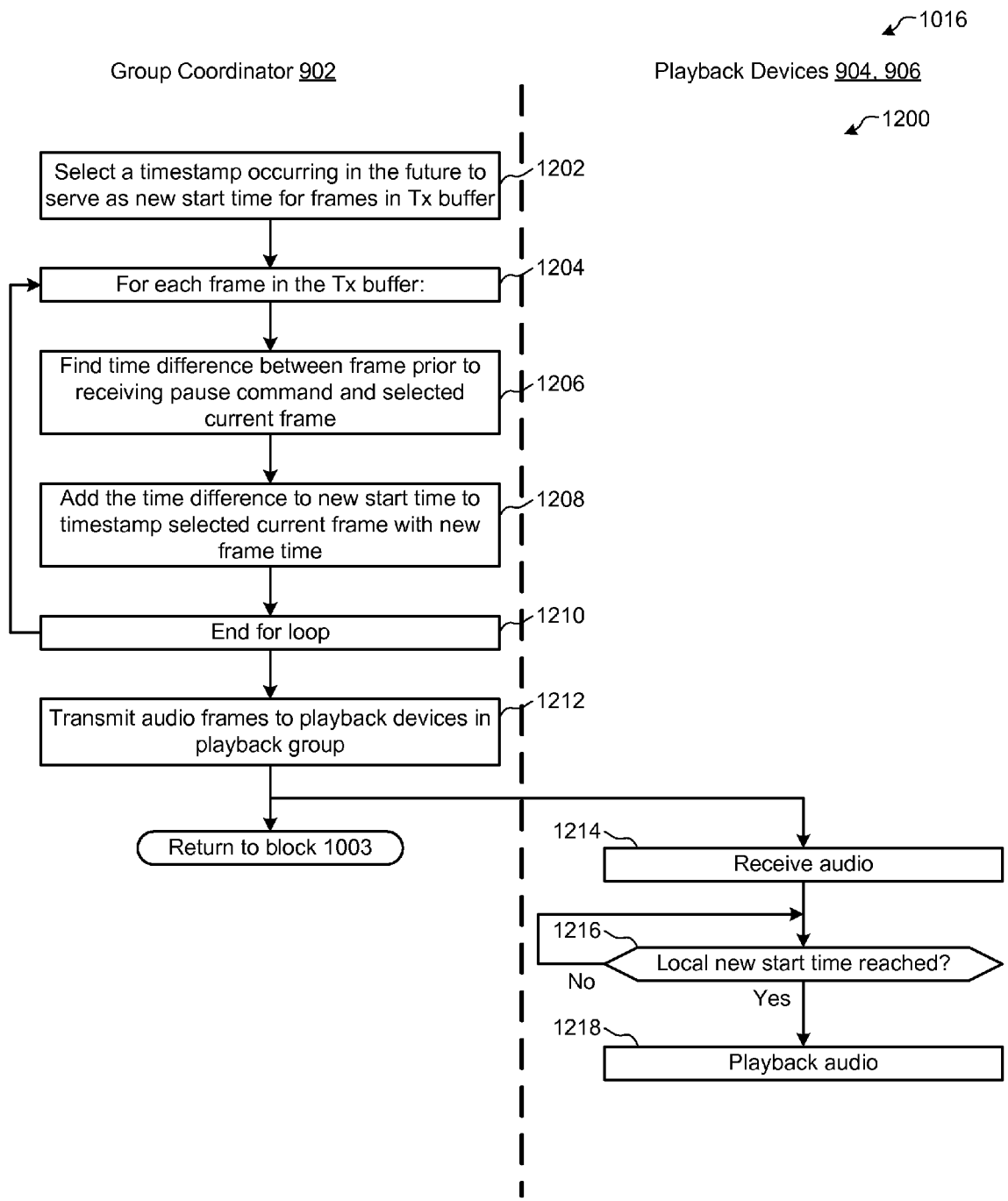
FIG. 12 is a flowchart of an example process to fast-resume playback of audio after a pause of audio.

Returning to FIG. 10, after a resume command is received, the process advances to block 1016. As shown, at block 1016, the group members fast-resume the playback of audio. FIG. 12 is a flowchart of an example process 1200 that may be used to implement block 1016 of FIG. 10. FIG. 12 will also be described with reference to the example playback group 900 of FIG. 9. In the example process 1200 of FIG. 12, the GC 902 of FIG. 9 re-timestamps each of the frames 914 in the Tx buffer 908 with new timestamps for synchronized playback by the devices 902-906 in the playback group and transmits the re-time stamped audio frames to the devices 904, 906. In contrast to known methods of resuming synchronized audio playback from a paused state, the process 1200 of FIG. 12 leverages the portions of the audio that were previously stored for playback so that a delay in receiving audio from an audio source does not delay the resumption of playback.

The example process 1200 begins when a resume command is received (e.g., at the GC 902 of FIG. 9). The example GC 902 selects a timestamp (e.g., referenced to the clock 910) occurring in the future to be a new start time for the frames 914 maintained in the Tx buffer 908 (block 1202). The timestamp selection may be performed in a manner similar to the timestamp selection that occurs when playback is initiated, and is used to synchronize playback of the audio by multiple devices 902-906.

Blocks 1204-1210 may operate as a logical "FOR" loop by iterating the blocks 1204-1210 until a condition is met or finished. The example block 1204 iterates execution of the FOR loop 1204-1210 for each frame 914 present in the Tx buffer 908. During execution of one iteration of the FOR loop 1204-1210, a frame 914 is considered to be selected. At block 1206, the GC 902 finds a time difference between a frame occurring prior to receiving the pause command (e.g., the most recent frame played (discussed in block 1104) or the next frame to be played (discussed in block 1106)) and the selected current frame. For example, the GC 902 may compare a timestamp of the frame occurring immediately prior to the pause command to a timestamp of the selected current frame to determine a time difference. The GC 902 adds the time difference (determined in block 1206) to the new start time (determined in block 1202) to timestamp the selected current frame with a new frame time (block 1208). For example, the GC 902 may modify the timestamp 918 of the selected current frame 914 with an updated time using new start time and the offset between the timestamp 918 of the selected current frame 914 and the relative track time. The GC 902 then returns to the beginning of the FOR loop 1204-1210 or ends the FOR loop 1204-1210 (block 1210) based on whether all of the frames 914 in the Tx buffer 908 have been processed via the FOR loop 1204-1210.

After processing each of the frames 914 via the FOR loop 1204-1210, the GC 902 transmits the newly time-stamped audio frames 914 in the Tx buffer 908 to the playback devices 904-906 in the playback group 900 (block 1212). For example, the frame 914 having the lowest timestamp 918 may be transmitted first. It should be understood that there are several methods by which GC could transmit the frames 914. For example, the GC 902 could transmit each frame after the frame has been processed and while the GC 902 is processing additional frames. As another example the GC 902 could transmit all of the frames after they have been updated.

At block 1214, the playback devices 904, 906 receive the frames, and update each frame's timestamp 918 to a local timestamp 930 based on the respective clocks 922 of the playback devices 904, 906. When the values of the clocks 922 reach the value of the local timestamp 930 (block 1216), the playback devices 904, 906 playback the audio information in the corresponding frame 926 (block 1218). If the GC 902 is also a group member, it may playback the audio synchronously with playback devices 904-906.

After the GC 902 finishes transmitting the updated frames to playback devices 902, 904, the example process 1200 may end and control returns to block 1003 of FIG. 10 to continue determining playback timing information. After transmitting the previous audio frames, the GC 902 begins time stamping and transmitting frames containing data received from the audio source. In some examples, the GC 902 may begin time stamping and transmitting frames to replace corresponding ones of the previous frames (e.g., previous frames having the same audio information) if the audio information is received from the audio source prior to the previous frames being exhausted. In some other examples, the GC 902 may request to receive audio information from the audio source beginning with audio information immediately following the audio information in the previous frames to avoid processing duplicate audio data and/or wasting processing and/or network resources.

As discussed above, some audio sources may change cryptographic parameters for audio content provided to the GC 902 subsequent to receipt of the resume command. In this case, the GC 902 may receive updated cryptographic parameters from the audio source and may transmit those parameters to playback devices 904, 906 for use in decrypting audio. As another example, playback devices 904, 906 could independently determine that the cryptographic parameters associated with the audio have changed, and may request new parameters from the audio source (or from the GC 902) directly.

Figure 13:
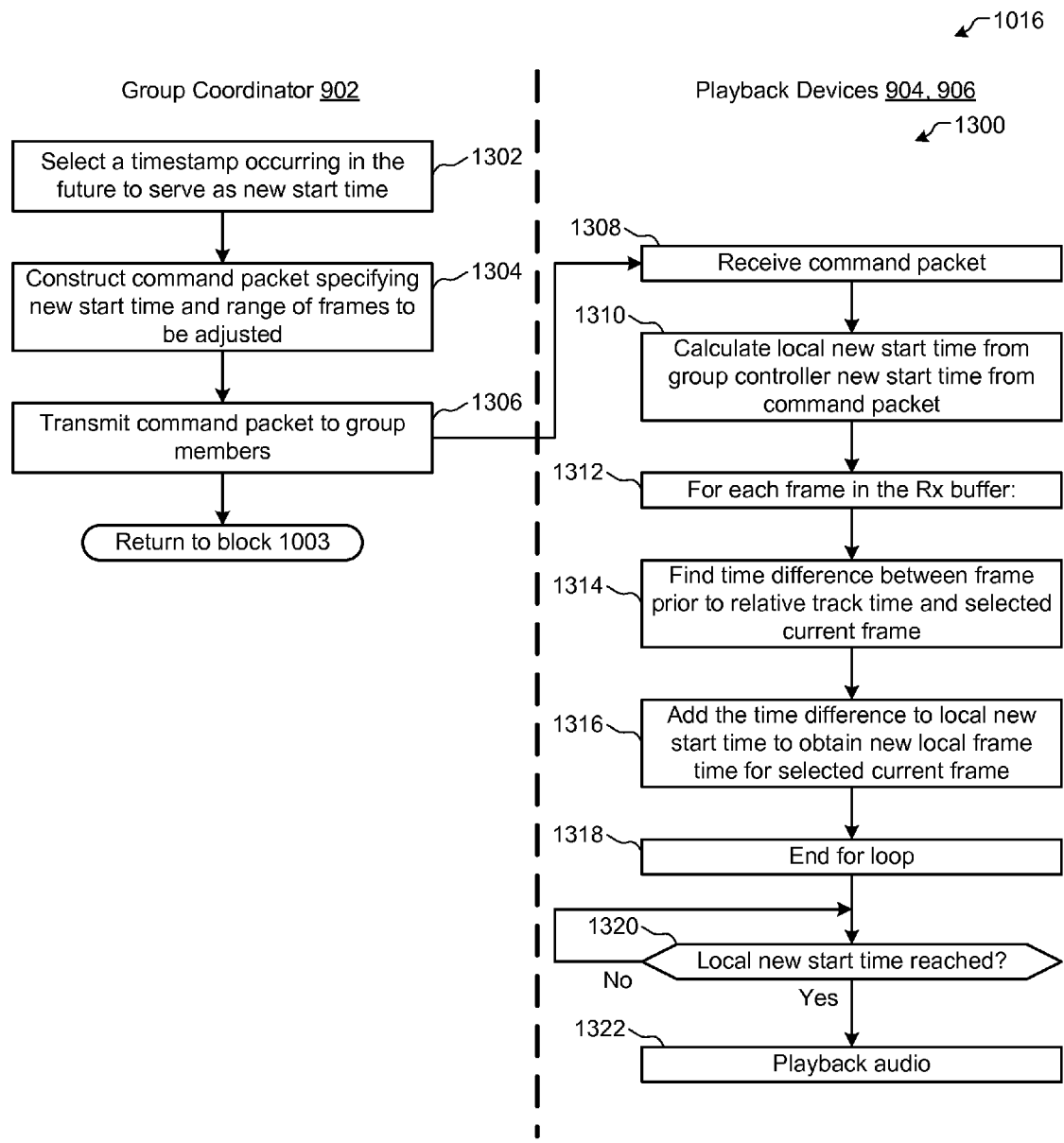
FIG. 13 is a flowchart of an example process to fast-resume playback of audio after a pause of audio.

FIG. 13 is a flowchart of another example process 1300 for fast-resuming playback of audio after a pause of audio. The example process 1300 of FIG. 13 may be used to implement block 1016 of FIG. 10, for example, and will be described with reference to the example playback group 900 of FIG. 9. In the example process 1300 of FIG. 13, the playback devices 904, 906 of FIG. 9 re-timestamp each of the frames 926 in the Rx buffer 920 using a new timestamps determined by the GC 902 for synchronized playback by the devices 902-906 in the playback group 900. In contrast with the example process 1200 of FIG. 12 in which the GC 902 retransmits audio data, the playback devices 904, 906 in process 1300 maintain the audio data subsequent to receipt of the pause command, and re-timestamp the data subsequent to receipt of a resume command.

The example process 1300 begins when a resume command is received (e.g., at the GC 902 of FIG. 9). The example GC 902 selects a timestamp (e.g., referenced to the clock 910) occurring in the future to be a new start time for the frames 914 in the Tx buffer 908 (block 1302). The timestamp selection may be performed in a manner similar to the timestamp selection described above, and is used to synchronize playback of the audio by multiple devices 902-906.

The GC 902 constructs a command packet specifying the new start time and a range of frames to be adjusted (block 1304). The range of frames in the command packet is referenced to the clock 910 of the GC 902 and may include, for example, a start timestamp and an end timestamp of the range, where any frame having a timestamp falling between the timestamps is considered to be within the range. The range of frames may be determined based on, for example, the timestamps 918 of the packets 914 present in the Tx buffer 908 (e.g., audio frames 914 present in the Tx buffer 908 subsequent to performance of the process 1100 of FIG. 11). The GC 902 transmits the command packet to the playback devices 904, 906 in the playback group 900 (block 1306) and the playback devices 904, 906 receive the command packet (block 1308).

The example playback device 904, 906 calculates a local new start time from the new start time received in the command packet (block 1310). The local new start time is determined using an offset between the clocks 910 and 922 determined by the playback device 904, 906 and results in a local new start time equivalent to the received new start time within an acceptable margin of error.

Blocks 1312-1318 are similar to blocks 1204-1210 of FIG. 12 and operate as a logical "FOR" loop by iterating the blocks 1312-1318 until a condition is met or finished. The example block 1312 iterates execution of the FOR loop 1312-1318 for each frame 926 present in the Rx buffer 920 of FIG. 9. During execution of one iteration of the FOR loop 1312-1318, a frame 926 is considered to be selected. The playback device 904, 906 finds a time difference between a frame occurring prior to receiving the pause command (e.g., the most recent frame played (discussed in block 1104) or the next frame to be played (discussed in block 1106), and the selected current frame (block 1314). For example, the playback device 904, 906 may compare a timestamp of the frame occurring immediately prior to the pause command to a timestamp 930 of the selected current frame 926 (e.g., referenced to the clock 922) to determine a difference (e.g., in counts or cycles of the clock 922). The playback device 904, 906 adds the time difference (determined in block 1314) to the new local start time (determined in block 1310) to timestamp the selected current frame 926 with a new local frame timestamp (block 1316). For example, the playback device 904, 906 modifies the timestamp 930 of the selected current frame 914 with an updated local time using the new local start time and the offset between the timestamp 930 of the selected current frame 926 and the relative track time. The playback device 904, 906 then returns to the beginning of the FOR loop 1312-1318 or ends the FOR loop 1312-1318 (block 1318) based on whether all of the frames 926 in the Rx buffer 920 have been processed via the FOR loop 1312-1318.

After processing each of the frames 926 via the FOR loop 1312-1318, the playback device 904 determines whether the local new start time has been reached by the clock 922 (block 1320). If the local new start time has not yet been reached (block 1320), control loops to block 1320 to continue waiting for the local new start time to occur.

When the local new start time is reached (block 1320), the playback device 904, 906 plays the audio in synchrony with other playback devices (including the GC 902) in the playback group 900 according to the timestamps 930 (block 1322).

As noted above, while playing the audio (block 1322), the example playback device 904, 906 may decrypt the audio frames 904 using a cryptographic key. For the frames within the range of frames (block 1304), the playback device 904 may use a cryptographic key received prior to the pause command. However, frames subsequent to the range of frames may require a different cryptographic key for successful decryption. The playback device 904, 906 may obtain new cryptographic parameters either from the GC 902 or from the audio source directly.

While blocks 1308-1322 are described above with reference to the playback device 904, the example blocks 1308-1322 may additionally or alternatively be performed by the playback device 906 (e.g., concurrently performed by the playback devices 904, 906).

The example process 1300 may end and control returns to block 1003 of FIG. 10 to continue receiving audio information and determining playback timing information. After transmitting the previous audio frames, the GC 902 begins time stamping and transmitting frames containing data received from the audio source. In some examples, the GC 902 may begin time stamping and transmitting frames to replace corresponding ones of the previous frames (e.g., previous frames having the same audio information) if the audio information is received from the audio source prior to the previous frames being exhausted. In some other examples, the GC 902 may request to receive audio information from the audio source beginning with audio information immediately following the audio information in the previous frames to avoid processing duplicate audio data and/or wasting processing and/or network resources.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As suggested above, the present application involves providing methods and apparatus to fast-resume audio playback.

In one aspect, a first method is provided. The first method involves transmitting, by a device to at least one playback device, a plurality of frames, each frame of the plurality of frames comprising audio information and playback timing information, the playback timing information identifying a time to play the audio information of the respective frame, wherein the playback timing information comprises a time relative to a master clock; receiving, by the device, a pause command, wherein the pause command indicates that the at least one playback device should cease playback of the audio information; subsequent to receiving the pause command, receiving, by the device, a resume command; based on the resume command, identifying, by the device, a range of frames previously transmitted by the device to the at least one playback device, wherein the range of frames have playback timing information subsequent to a time that the device received the pause command; based on the resume command, instructing, by the device, the at least one playback device to (i) update the playback timing information in the range of frames, and (ii) play the audio information.

In another aspect, a second method is provided. The second method involves transmitting, by a device to at least one playback device, a plurality of frames, each frame of the plurality of frames comprising audio information and playback timing information, the playback timing information identifying a time to play the audio information of the respective frame, wherein the playback timing information comprises a time relative to a master clock; receiving, by the device, a pause command, wherein the pause command indicates that the at least one playback device should cease playback of the audio information; subsequent to receiving the pause command, receiving, by the device, a resume command; based on the resume command, identifying, by the device, a range of frames maintained on the device, wherein the range of frames have playback timing information subsequent to a time that the device received the pause command; and based on the resume command, (i) updating, by the device, the playback timing information in the range of frames, and (ii) transmitting, by the device, the updated frames to the at least one playback device.

In yet another aspect, a third method is provided. The third method involves receiving, by a playback device from a device, a plurality of frames, each frame of the plurality of frames comprising audio information and playback timing information, the playback timing information identifying a time to play the audio information of the respective frame; receiving, by the playback device, a pause command, the pause command indicating that playback of the audio information should be ceased; based on the received pause command, ceasing playback, by the playback device, of the audio information at a specified pause time; subsequent to receiving the pause command, maintaining, by the playback device, at least a portion of the plurality of frames received from the device having playback timing information subsequent to the specified pause time; subsequent to receiving the pause command, receiving, by the playback device, a command to resume playback; and based on the command to resume playback, (i) updating, by the playback device, the playback timing information of the at least a portion of the plurality of frames received from the device, and (ii) playing, by the playback device, the audio information based on the updated playback timing information.

In a further aspect, a first non-transitory computer readable medium having instructions stored thereon is provided. The instructions are executable by a computing device to cause the computing device to at least transmit, to at least one playback device, a plurality of frames, each frame of the plurality of frames comprising audio information and playback timing information, the playback timing information identifying a time to play the audio information of the respective frame, wherein the playback timing information comprises a time relative to a master clock; receive a pause command, wherein the pause command indicates that the at least one playback device should cease playback of the audio information; subsequent to receiving the pause command, receive a resume command; based on the resume command, identify a range of frames previously transmitted by the device to the at least one playback device, wherein the range of frames have playback timing information subsequent to a time that the device received the pause command; and based on the resume command, instruct the at least one playback device to (i) update the playback timing information in the range of frames, and (ii) play the audio information.

In another aspect, a second non-transitory computer readable medium having instructions stored thereon is provided. The instructions are executable by a computing device to cause the computing device to at least transmit to at least one playback device, a plurality of frames, each frame of the plurality of frames comprising audio information and playback timing information, the playback timing information identifying a time to play the audio information of the respective frame, wherein the playback timing information comprises a time relative to a master clock; receive a pause command, wherein the pause command indicates that the at least one playback device should cease playback of the audio information; subsequent to receiving the pause command, receive a resume command; based on the resume command, identify a range of frames maintained on the device, wherein the range of frames have playback timing information subsequent to a time that the device received the pause command; and based on the resume command, (i) update the playback timing information in the range of frames, and (ii) transmit the updated frames to the at least one playback device.

In yet another aspect, a third non-transitory computer readable medium having instructions stored thereon is provided. The instructions are executable by a computing device to cause the computing device to at least receive from a device, a plurality of frames, each frame of the plurality of frames comprising audio information and playback timing information, the playback timing information identifying a time to play the audio information of the respective frame; receive a pause command, the pause command indicating that playback of the audio information should be ceased; based on the received pause command, cease playback of the audio information at a specified pause time; subsequent to receiving the pause command, maintain at least a portion of the plurality of frames received from the device having playback timing information subsequent to the specified pause time; subsequent to receiving the pause command, receive a command to resume playback; and based on the command to resume playback, (i) update the playback timing information of the at least a portion of the plurality of frames received from the device, and (ii) play the audio information based on the updated playback timing information.

In a further aspect, a first computing device includes a processor. The first device is arranged to transmit, to at least one playback device, a plurality of frames, each frame of the plurality of frames comprising audio information and playback timing information, the playback timing information identifying a time to play the audio information of the respective frame, wherein the playback timing information comprises a time relative to a master clock; receive a pause command, wherein the pause command indicates that the at least one playback device should cease playback of the audio information; subsequent to receiving the pause command, receive a resume command; based on the resume command, identify a range of frames previously transmitted by the device to the at least one playback device, wherein the range of frames have playback timing information subsequent to a time that the device received the pause command; and based on the resume command, instruct the at least one playback device to (i) update the playback timing information in the range of frames, and (ii) play the audio information.

In another aspect, a second computing device includes a processor. The second device is arranged to transmit to at least one playback device, a plurality of frames, each frame of the plurality of frames comprising audio information and playback timing information, the playback timing information identifying a time to play the audio information of the respective frame, wherein the playback timing information comprises a time relative to a master clock; receive a pause command, wherein the pause command indicates that the at least one playback device should cease playback of the audio information; subsequent to receiving the pause command, receive a resume command; based on the resume command, identify a range of frames maintained on the device, wherein the range of frames have playback timing information subsequent to a time that the device received the pause command; and based on the resume command, (i) update the playback timing information in the range of frames, and (ii) transmit the updated frames to the at least one playback device.

In yet another aspect, a playback device includes a processor. The playback device is arranged to receive from a device, a plurality of frames, each frame of the plurality of frames comprising audio information and playback timing information, the playback timing information identifying a time to play the audio information of the respective frame; receive a pause command, the pause command indicating that playback of the audio information should be ceased; based on the received pause command, cease playback of the audio information at a specified pause time; subsequent to receiving the pause command, maintain at least a portion of the plurality of frames received from the device having playback timing information subsequent to the specified pause time; subsequent to receiving the pause command, receive a command to resume playback; and based on the command to resume playback, (i) update the playback timing information of the at least a portion of the plurality of frames received from the device, and (ii) play the audio information based on the updated playback timing information.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A method comprising:
    transmitting, by a device to at least one playback device, a plurality of frames, each frame of the plurality of frames comprising audio information and playback timing information, the playback timing information identifying a time to play the audio information of the respective frame, wherein the playback timing information comprises a time relative to a master clock;
    receiving, by the device, a pause command, wherein the pause command indicates that the at least one playback device is to cease playback of the audio information;
    subsequent to receiving the pause command, receiving, by the device, a resume command;
    based on the resume command, identifying, by the device, a range of frames previously transmitted by the device to the at least one playback device, wherein the range of frames have playback timing information subsequent to a time that the device received the pause command; and selecting a new start time corresponding to the range of frames;
    based on the resume command, instructing, by the device, the at least one playback device to (i) update the playback timing information in the range of frames based on the new start time, and (ii) play based on the new start time the audio information; and
    play the audio information, by the device, in synchrony with the at least one playback device based on the new start time;
    wherein instructing the at least one playback device to update the playback timing information in the range of frames based on the new start time comprises instructing the at least one playback device to update one or more first timestamps in the range of frames based on the new start time; and
    wherein playing the audio information, by the device, in synchrony with the at least one playback device based on the new start time comprises updating one or more second timestamps to be synchronized with the one or more first timestamps and playing, by the device, the audio information based on the one or more second timestamps.

2. The method of claim 1, wherein the instructing, by the device, the at least one playback device to update the playback timing information in the range of frames further comprises:
    instructing, by the device, the at least one playback device to update the playback timing information in the range of frames when the range of frames is above a threshold number of frames.

3. The method of claim 1, wherein the audio information is received in a first audio stream by the device prior to transmission, by the device, to the at least one playback device.

4. The method of claim 3, wherein the first audio stream is associated with a first cryptographic key.

5. The method of claim 4, further comprising:
    based on the pause command, terminating, by the device, reception of the first audio stream.

6. The method of claim 5, further comprising:
    based on the resume command, initiating reception, by the device, of the audio information in a second audio stream;
    determining, by the device, whether the second audio stream is associated with the first cryptographic key or with a different cryptographic key; and
    when the second audio stream is associated with the different cryptographic key, providing, by the device, the different cryptographic key to the at least one playback device.

7. The method of claim 1, wherein the device comprises a playback device.

8. A non-transitory computer-readable storage medium including a set of instructions for execution by a processor, the set of instructions, when executed cause a device to:
    transmit, to at least one playback device, a plurality of frames, each frame of the plurality of frames comprising audio information and playback timing information, the playback timing information identifying a time to play the audio information of the respective frame, wherein the playback timing information comprises a time relative to a master clock;

receive a pause command, wherein the pause command indicates that the at least one playback device is to cease playback of the audio information;

subsequent to receiving the pause command, receive a resume command;

based on the resume command, identify a range of frames previously transmitted by the device to the at least one playback device, wherein the range of frames have playback timing information subsequent to a time that the device received the pause command; and selecting a new start time corresponding to the range of frames;

based on the resume command, instruct the at least one playback device to (i) update the playback timing information in the range of frames based on a new start time, and (ii) play based on the new start time the audio information; and play the audio information, by the device, in synchrony with the at least one playback device based on the new start time;

wherein instructing the at least one playback device to update the playback timing information in the range of frames based on the new start time comprises instructing the at least one playback device to update one or more first timestamps in the range of frames based on the new start time; and wherein playing the audio information, by the device, in synchrony with the at least one playback device based on the new start time comprises updating one or more second timestamps to be synchronized with the one or more first timestamps and playing, by the device, the audio information based on the one or more second timestamps.

9. The computer-readable medium of claim 8, wherein the device instructs the at least one playback device to update the playback timing information in the range of frames when the range of frames is above a threshold number of frames.

10. The computer-readable medium of claim 8, wherein the audio information is received in a first audio stream by the device prior to transmission, by the device, to the at least one playback device.

11. The computer-readable medium of claim 10, wherein the first audio stream is associated with a first cryptographic key.

12. The computer-readable medium of claim 11, further comprising instructions that when executed cause the device to:
terminate, based on the pause command, reception of the first audio stream.

13. The computer-readable medium of claim 12, further comprising instructions that when executed cause the device to:
based on the resume command, initiate reception of the audio information in a second audio stream;
determine whether the second audio stream is associated with the first cryptographic key or with a different cryptographic key; and
when the second audio stream is associated with the different cryptographic key, provide the different cryptographic key to the at least one playback device.

14. The computer-readable medium of claim 8, wherein the device comprises a playback device.

15. A computing device including a processor, the computing device arranged to:
transmit, to at least one playback device, a plurality of frames, each frame of the plurality of frames comprising audio information and playback timing information, the playback timing information identifying a time to play the audio information of the respective frame, wherein the playback timing information comprises a time relative to a master clock;
receive a pause command, wherein the pause command indicates that the at least one playback device is to cease playback of the audio information;
subsequent to receiving the pause command, receive a resume command;
based on the resume command, identify a range of frames previously transmitted by the device to the at least one playback device, wherein the range of frames have playback timing information subsequent to a time that the device received the pause command; and selecting a new start time corresponding to the range of frames;
based on the resume command, instruct the at least one playback device to (i) update the playback timing information in the range of frames based on a new start time and (ii) play based on the new start time the audio information; and
play the audio information, by the device, in synchrony with the at least one playback device based on the new start time;
wherein instructing the at least one playback device to update the playback timing information in the range of frames based on the new start time comprises instructing the at least one playback device to update one or more first timestamps in the range of frames based on the new start time; and
wherein playing the audio information, by the device, in synchrony with the at least one playback device based on the new start time comprises updating one or more second timestamps to be synchronized with the one or more first timestamps and playing, by the computing device, the audio information based on the one or more second timestamps.

16. The computing device of claim 15, wherein the audio information is received in a first audio stream by the device prior to transmission, by the device, to the at least one playback device.

17. The computing device of claim 16, wherein the first audio stream is associated with a first cryptographic key.

18. The computing device of claim 17, further arranged to:
terminate, based on the pause command, reception of the first audio stream.

19. The computing device of claim 18, further arranged to:
based on the resume command, initiate reception of the audio information in a second audio stream;
determine whether the second audio stream is associated with the first cryptographic key or with a different cryptographic key; and
when the second audio stream is associated with the different cryptographic key, provide the different cryptographic key to the at least one playback device.

20. The device of claim 15, wherein the device comprises a playback device.

* * * * *